(12) United States Patent
Liu

(10) Patent No.: US 10,268,253 B2
(45) Date of Patent: Apr. 23, 2019

(54) FLEXIBLE DISPLAY WITH POWER CONSUMPTION

(71) Applicant: AU Optronics Corporation, Hsin-Chu (TW)

(72) Inventor: Yi-Cheng Liu, Hsin-Chu (TW)

(73) Assignee: AU OPTRONICS CORPORATION, Hsin-Chu (TW)

(*) Notice: Subject to any disclaimer, the term of this patent is extended or adjusted under 35 U.S.C. 154(b) by 20 days.

(21) Appl. No.: 15/646,213

(22) Filed: Jul. 11, 2017

(65) Prior Publication Data

US 2018/0088654 A1 Mar. 29, 2018

(30) Foreign Application Priority Data

Sep. 23, 2016 (TW) .............................. 105130930 A

(51) Int. Cl.
*G06F 1/16* (2006.01)
*G06F 1/32* (2006.01)
(Continued)

(52) U.S. Cl.
CPC .......... *G06F 1/3218* (2013.01); *G06F 1/1624* (2013.01); *G06F 1/1652* (2013.01); *G06F 1/3265* (2013.01); *G09G 3/2092* (2013.01); *G09G 2310/0213* (2013.01); *G09G 2310/0267* (2013.01); *G09G 2310/0286* (2013.01);
(Continued)

(58) Field of Classification Search
None
See application file for complete search history.

(56) References Cited

U.S. PATENT DOCUMENTS

| 9,564,889 B2 | 2/2017 | Lin et al. |
| 2007/0091059 A1 | 4/2007 | Kang |
| (Continued) | | |

FOREIGN PATENT DOCUMENTS

| CN | 105702193 A | 6/2016 |
| TW | 201011732 A | 3/2010 |
| TW | 1496127 | 8/2015 |

OTHER PUBLICATIONS

Taiwan patent office "Office Action" dated Jul. 17, 2017, Taiwan.
China Patent Office "Office Action" dated Sep. 3, 2018, China.

*Primary Examiner* — David D Davis
(74) *Attorney, Agent, or Firm* — WPAT, PC

(57) ABSTRACT

A flexible display includes a display panel, a gate driver, and a bending sensing unit. The display panel has a plurality of rows of pixels arranged in sequence. The gate driver has a plurality of stages of shift register circuitries electrically coupled to each other in sequence. The shift register circuitries are electrically coupled to the plurality of rows of pixels, and are configured to provide a plurality of refreshing pulses for driving the plurality of rows of pixels to refresh. Each stage of the shift register circuitries are further configured to provide a trigger pulse to drive another stage of the shift register circuitries. The bending sensing unit is electrically coupled to the gate driver. The bending sensing unit is configured to control, according to bending of the display panel, the impedance of a path used by at least one of the stages of the shift register circuitries to transmit the trigger pulse to the other stage of the shift register circuitries.

13 Claims, 23 Drawing Sheets

(51) Int. Cl.
*G09G 3/20* (2006.01)
*G06F 1/3218* (2019.01)
*G06F 1/3234* (2019.01)

(52) U.S. Cl.
CPC . *G09G 2330/021* (2013.01); *G09G 2330/023* (2013.01); *G09G 2330/028* (2013.01); *G09G 2380/02* (2013.01)

(56) References Cited

U.S. PATENT DOCUMENTS

| | | |
|---|---|---|
| 2010/0066716 A1 | 3/2010 | Gerard-Goddet |
| 2012/0019482 A1 | 1/2012 | Wang |
| 2012/0038613 A1 | 2/2012 | Choi |
| 2013/0265221 A1 | 10/2013 | Lee et al. |
| 2013/0265257 A1 | 10/2013 | Jung et al. |
| 2014/0002430 A1 | 1/2014 | Kwack et al. |
| 2017/0034320 A1* | 2/2017 | Stewart ............... H04M 1/0268 |

\* cited by examiner

FLEXIBLE DISPLAY WITH POWER CONSUMPTION

CROSS-REFERENCE TO RELATED APPLICATION

The instant application claims priority to Taiwan patent application NO. 105130930, filed on Sep. 23, 2016. The content of the above application is incorporated by reference in its entirety.

BACKGROUND

Technical Field

The present invention relates to a flexible display, and in particular, to a flexible display having a bending sensing unit.

Related Art

With the growing demands of users, display panels have correspondingly growing mainstream sizes. Moreover, even if for a portable apparatus, users also want to have both advantages of easy portability and large display sizes.

In recent years, flexible displays become a solution that has both advantages of large display sizes and easy portability or placement in the field of home displays or portable displays. However, with the advancement of technologies, energy consumption saving demands of displays gradually increase in the market.

SUMMARY

Certain embodiments of the present invention provide a flexible display, so as to save electric power consumption of the flexible display.

A particular embodiment of the present invention provides a flexible display, comprising a display panel, a gate driver, and a bending sensing unit. The display panel comprises an $N^{th}$ row of pixels and an $(N+K)^{th}$ row of pixels. The gate driver has an $M^{th}$ stage of shift register circuitries and an $(M+L)^{th}$ stage of shift register circuitries. The $M^{th}$ stage of shift register circuitries are electrically coupled to the $N^{th}$ row of pixels and have an output terminal. The output terminal is configured to output a trigger pulse to the $(M+L)^{th}$ stage of shift register circuitries to enable the $(M+L)^{th}$ stage of shift register circuitries. The $(M+L)^{th}$ stage of shift register circuitries are electrically coupled to the $M^{th}$ stage of shift register circuitries and the $(N+K)^{th}$ row of pixels. The $(M+L)^{th}$ stage of shift register circuitries have a receiving terminal, and are configured to receive the trigger pulse. The $(M+L)^{th}$ stage of shift register circuitries are further configured to output a refreshing pulse according to the trigger pulse to refresh the $(N+K)^{th}$ row of pixels, wherein N, M, L, and K are positive integers. The bending sensing unit is electrically coupled to the gate driver and is connected to the display panel. The bending sensing unit comprises at least one impedance control circuitry. The impedance control circuitry has different impedances according to bending of the display panel. The at least one impedance control circuitry is electrically coupled between the output terminal and the receiving terminal.

An impedance control circuitry has different impedances according to bending of a display panel, so that transmission of a trigger pulse between shift register circuitries can be controlled. Therefore, a plurality of stages of shift register circuitries that are connected in series can be disabled and not triggered, so as to stop refreshing of a particular pixel on the display panel, thereby achieving an effect of reducing power consumption.

According to a particular optional embodiment, the impedance control circuitry comprises a variable resistor. The variable resistor has different impedances according to the bending of the display panel. A terminal of the variable resistor is electrically coupled to the output terminal, and the other terminal of the variable resistor is electrically coupled to the receiving terminal.

According to a particular optional embodiment, the display panel has a non-curved portion and a curved portion. The curvature of the curved portion is greater than the curvature of the non-curved portion. A quantity of the at least one impedance control circuitry is greater than 1. The variable resistors of the impedance control circuitrys are respectively disposed at the curved portion and the non-curved portion. The impedance of the variable resistor disposed at the curved portion is greater than the impedance of the impedance control circuitry attached to the curved portion.

According to a particular optional embodiment, the impedance control circuitry has a first switch. The first switch has a first terminal, a second terminal, and a control terminal. The first terminal is electrically coupled to the output terminal, and the second terminal is electrically coupled to the receiving terminal. The bending sensing unit further has impedance control circuitries. The impedance control circuitries are electrically coupled to the impedance control circuitry. The impedance control circuitries are electrically coupled to the control terminal and have a first capacitor, and are configured to change a capacitance value of the first capacitor according to sensed pressure to control the voltage potential of the control terminal, to further control the first terminal of the first switch and the second terminal of the first switch to be turned on or turned off.

According to a particular optional embodiment, the pressure-sensitive circuit further has a second capacitor. A first terminal of the first capacitor is configured to receive a first reference voltage. A second terminal of the first capacitor is electrically coupled to a first terminal of the second capacitor and the control terminal of the first switch. A second terminal of the second capacitor is configured to receive a second reference voltage.

According to a particular optional embodiment, the pressure-sensitive circuit further has a second switch. A first terminal of the second switch is configured to receive a first reference voltage. A second terminal of the second switch is electrically coupled to a first terminal of the first capacitor and the control terminal of the first switch. A control terminal of the second switch is configured to receive a control signal. A second terminal of the first capacitor is configured to receive a second reference voltage.

According to a particular optional embodiment, the display panel has a non-curved portion and a curved portion. The curvature of the curved portion is greater than the curvature of the non-curved portion. The impedance control circuitries are respectively disposed at the curved portion and the non-curved portion. A capacitance value of the first capacitor disposed at the curved portion is greater than a capacitance value of the first capacitor disposed at the non-curved portion.

A particular embodiment of the present invention provides a flexible display, comprising a display panel, a gate driver, and a bending sensing unit. The display panel has a plurality of rows of pixels arranged in sequence. The gate driver has a plurality of stages of shift register circuitries electrically coupled to each other in sequence. The shift register circuitries are electrically coupled to the plurality of rows of pixels, and are configured to provide a plurality of refreshing pulses for driving the plurality of rows of pixels to refresh. Each stage of the shift register circuitries are further configured to provide a trigger pulse to drive the other stage of the shift register circuitries, to enable the other stage of the shift register circuitries to generate one of the refreshing pulses. The bending sensing unit is electrically coupled to the gate driver. The bending sensing unit is configured to control, according to bending of the display panel, the impedance of a path used by at least one of the stages of the shift register circuitries to transmit the trigger pulse to the other stage of the shift register circuitries.

According to a particular optional embodiment, the bending sensing unit has a plurality of variable resistors. The variable resistors have different impedances according to the bending of the display panel. A terminal of each variable resistor is electrically coupled to an output terminal of one of the stages of the shift register circuitries, and the other terminal of each variable resistor is electrically coupled to a receiving terminal of the other stage of the shift register circuitries. The output terminal is configured to provide the trigger pulse. The receiving terminal is configured to receive the trigger pulse. The variable resistors are arranged in sequence on a side of the display panel. An extending axial direction of the arrangement of the variable resistors is approximately parallel to an extending axial direction in which a non-curved portion of the display panel extends outwards from a curved portion of the display panel.

According to a particular optional embodiment, the bending sensing unit has a plurality of variable capacitors. The variable capacitors have different capacitance values according to the bending of the display panel, to further control the impedance of a transmission path used by one of the stages of the shift register circuitries to transmit the trigger pulse to the other stage of the shift register circuitries. The variable capacitors are arranged in sequence on a side of the display panel. An extending axial direction of the arrangement of the variable capacitors is approximately parallel to an extending axial direction in which a non-curved portion of the display panel extends outwards from a curved portion of the display panel.

According to a particular optional embodiment, the plurality of stages of shift register circuitries of the gate driver are arranged in sequence from a tail terminal of a non-curved portion of the display panel towards a tail terminal of a curved portion of the display panel. The flexible display further comprises a control circuit. The control circuit is electrically coupled to the gate driver, and is configured to provide an initial pulse to the gate driver, to enable the plurality of stages of shift register circuitries so that the plurality of stages of shift register circuitries generate the refreshing pulses in sequence starting from the shift register circuit at the tail terminal of the non-curved portion.

An impedance control circuitry has different impedances according to bending of a display panel, so that transmission of a trigger pulse between shift register circuitries can be controlled. Therefore, a plurality of stages of shift register circuitries that are connected in series can be disabled and not triggered, so as to stop refreshing of a particular pixel on the display panel, thereby achieving an effect of reducing power consumption.

DETAILED DESCRIPTION

Figure 1:
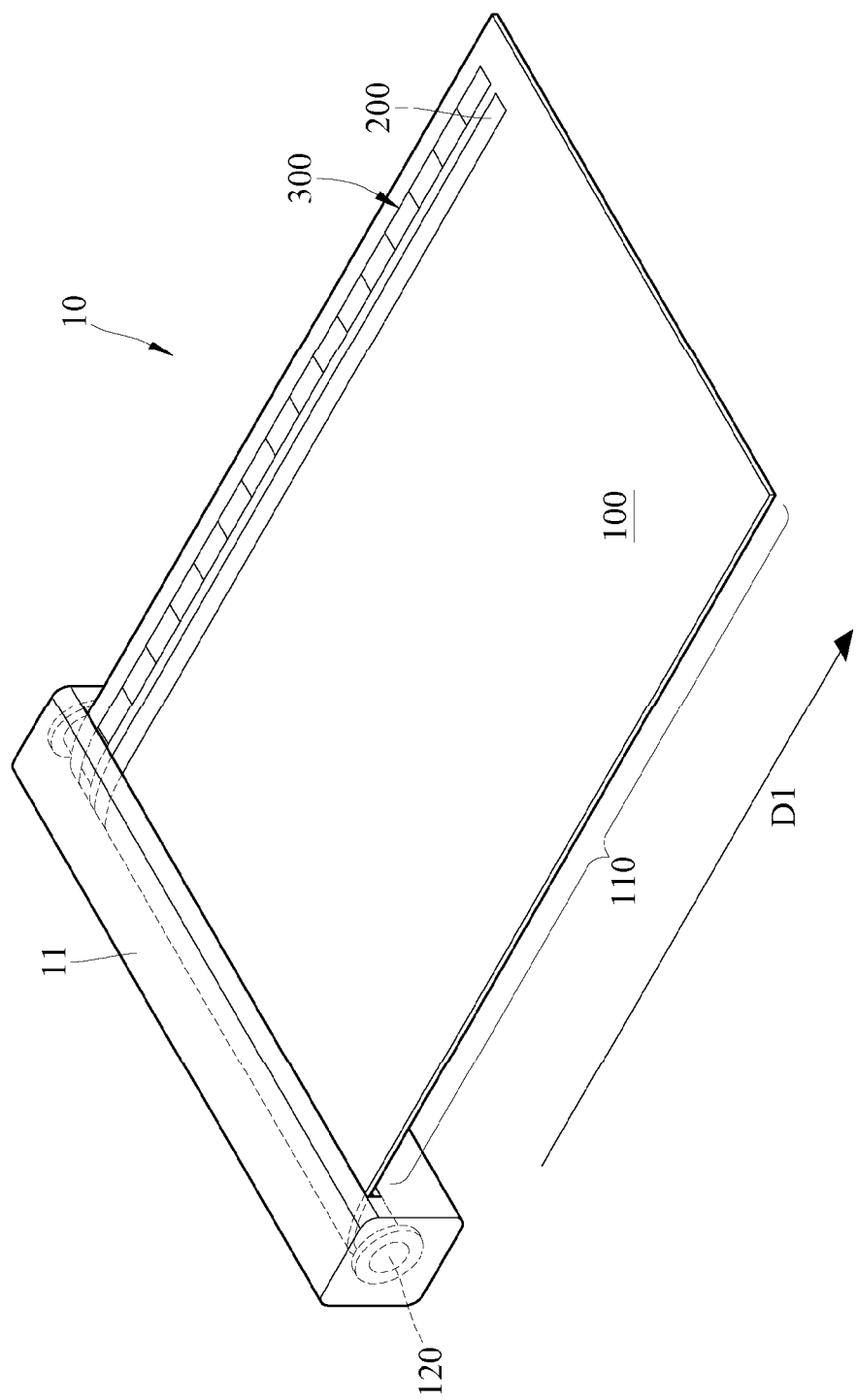
FIG. 1 is a perspective view of a flexible display according to an embodiment of the present invention.

The terms used in the present disclosure generally have plain meanings of the terms in the background field of the present disclosure and meanings of the terms being used in a particular background. Some particular terms that are used to describe the present disclosure are defined and discussed below or are discussed in other places of the specification, to enable a person skilled in the art to understand the description of the present disclosure. In addition, a same object may be described in more than one manner, and it should be understood that the meaning of the object is selectively one of multiple description manners or a general meaning. Therefore, a replaceable expression or synonym is used herein to represent any one or more terms. No matter whether this term is elaborately described or discussed herein, the use of a replaceable expression and synonym does not have a particular meaning. The present disclosure provides synonyms of some terms. One or more common synonyms do not exclude the use of other synonyms. In this specification, an example mentioned in any position and an example including any discussed term are both used for description only, and do not limit the range and meaning of the present disclosure or any term that is used as an example for description. Similarly, the present disclosure is also not limited to various embodiments provided in this specification.

It may be understood that when an element is (electrically) coupled to another element, the element may be directly (electrically) coupled to the other element, or an element may exist between the element and the other element. In contrast, when an element is directly (electrically) coupled to another element, no element exists between the element and the other element. In addition, the meaning of "(electrically) connected" should be understood similarly. The interpretation of such terms should dependent the general understanding of the technicians in the corresponding field of artsit may be further understood that, for the description of signal transmission or provision herein, a transmitted signal may be attenuated or distorted, but the attenuated or distorted signal still has a correspondence with the signal before transmission. A correspondence between two signals at a signal transmission terminal and a signal receiving terminal is usually kept regardless of attenuation or distortion that occurs during transmission. In addition, a signal buffering unit and/or a signal strengthening unit may also exist between the signal transmission terminal and the signal receiving terminal, to compensate for attenuation of a signal. However, this does not affect the correspondence between the two signals at the signal transmission terminal and the signal receiving terminal.

It may be further understood that when an element is located on or above another element, the element may be directly located on the other element, or an element may exist between the element and the other element. In contrast, when an element is directly located on another element, no element exists between the element and the other element. The term "and/or" includes any one and all combinations of one or more related listed items.

It may be further understood that words such as "first", "second", and "third" are used to describe various elements, components, areas, layers and/or parts. However, these elements, components, areas, layers and/or parts should not be limited by these terms. These words are only used for distinguishing between an element, a component, an area, a layer and/or a part from another element, component, area, layer and/or part. Therefore, a first element, component, area, layer and/or part hereinafter may also be referred to as a second element, component, area, layer and/or part without departing from the concept of the present disclosure.

The terms used herein are only used for the objective of describing particular embodiments, rather than to limit the present disclosure. As used herein, unless clearly designated in the content, singular forms "a" and "the" also intend to include a plural form. It is further understood that when the term "include" or "have" is used in the specification, the presence of a feature, an area, a whole, a step, an operation, an element, and/or a member is clearly described, but the presence or addition of one or more other features, areas, wholes, steps, operations, elements, components and/or groups thereof is not excluded.

In addition, the relative terms such as "under" or "bottom", "on" or "top", and "left" or "right" herein may be used to describe a relationship between an element and another element shown in the drawings. It may be understood that, in addition to the positions depicted in the drawings, the relative terms intend to include different positions of the elements. For example, if elements in the drawings are inverted, an element that is described to be "under" another element becomes located above the other element. Therefore, the exemplary term "under" may include two positions "under" and "on" according to particular positions of the drawings. Similarly, if elements in the drawings are inverted, an element that is described to be "below" another element becomes located "above" the other element. Therefore, the exemplary term "below" may include two positions "above" and "below".

The term "approximately", "about" or "nearly" used herein should substantially mean that a value is within 20 percent of a given value or range, or preferably within 10 percent, or more preferably within 5 percent. An approximate quantity is provided herein, and it refers to that unless specifically indicated, the term "approximately", "about" or "nearly" may be used for representation.

Verbs may be used to limit apparatus claims. In particular cases, a person of ordinary skill in the art may understand that similar limitation is limitation on structural description rather than on a manufacturing method. For example, a first element is "welded" on a second element, a first element is "disposed" on a second element, a first element is "formed" on a second element, a "grounded" lead, a "twisted" column, a printed material is "applied" on a substrate, and a conductive via (or through hole) "exposes" a metal electrode there below.

Figure 13A:
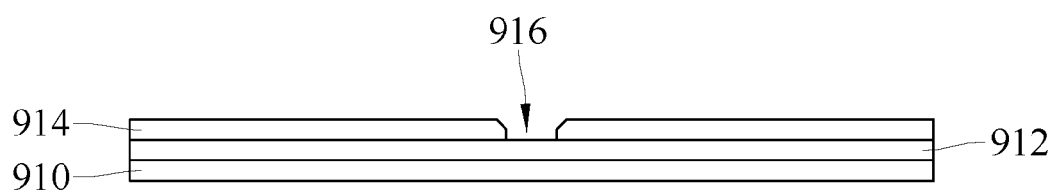
FIG. 13A to FIG. 13C show meanings of relationships between elements according to the present invention.
Figure 13B:
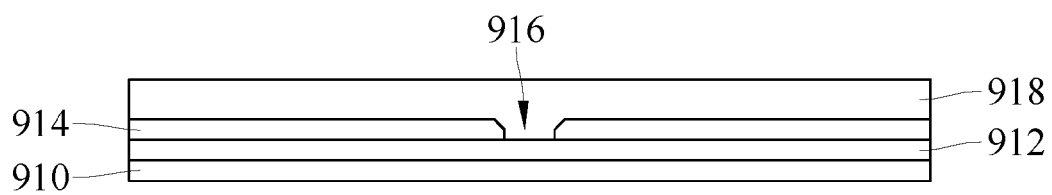
Figure 13C:
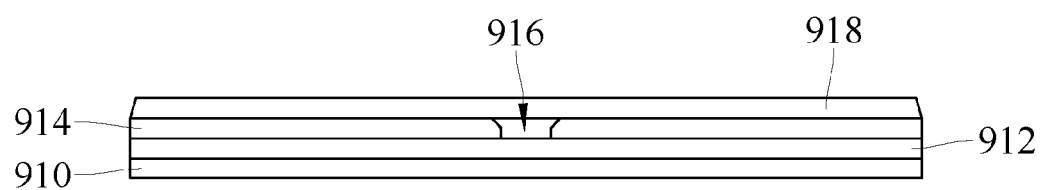
Figure 14A:
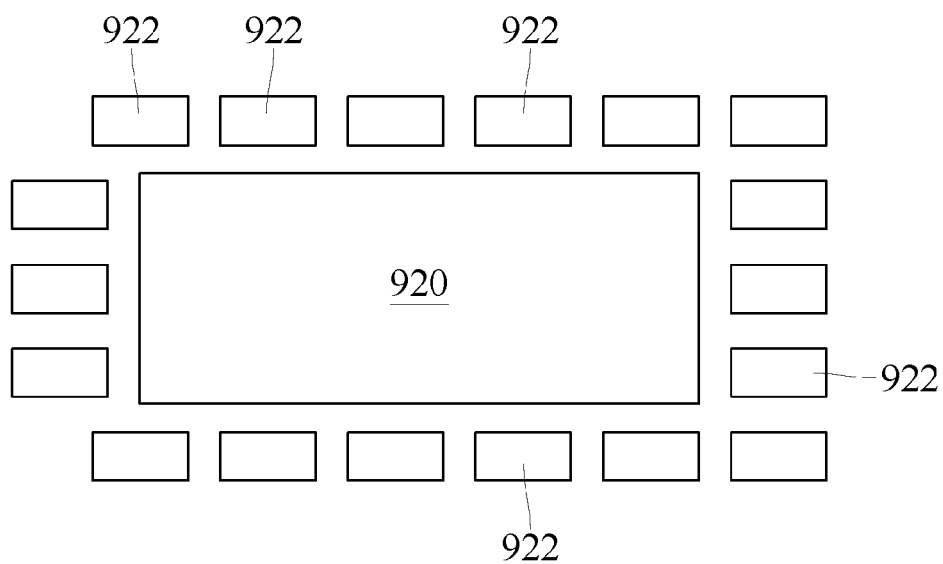
FIG. 14A to FIG. 14F show meanings of relationships between elements according to the present invention.
Figure 14B:
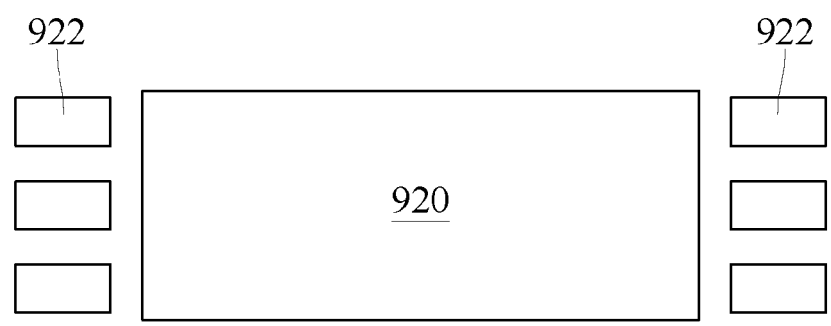
Figure 14C:
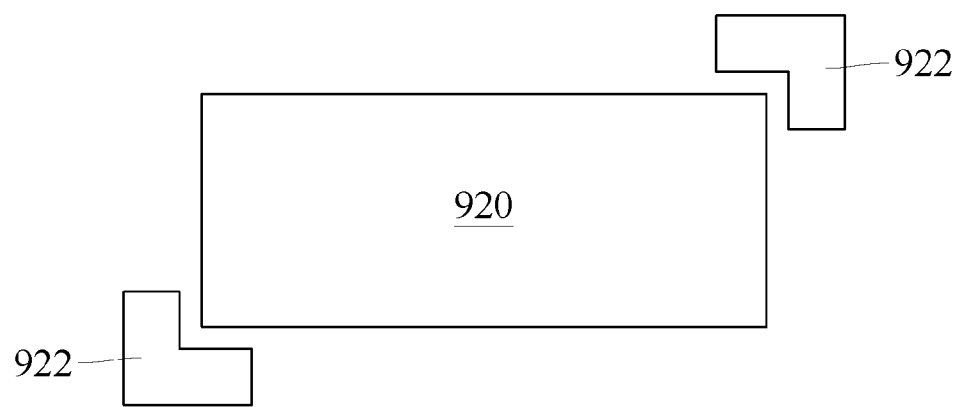
Figure 14D:
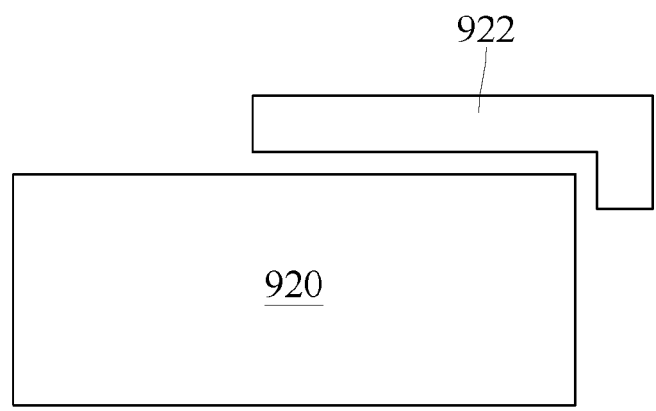
Figure 14E:
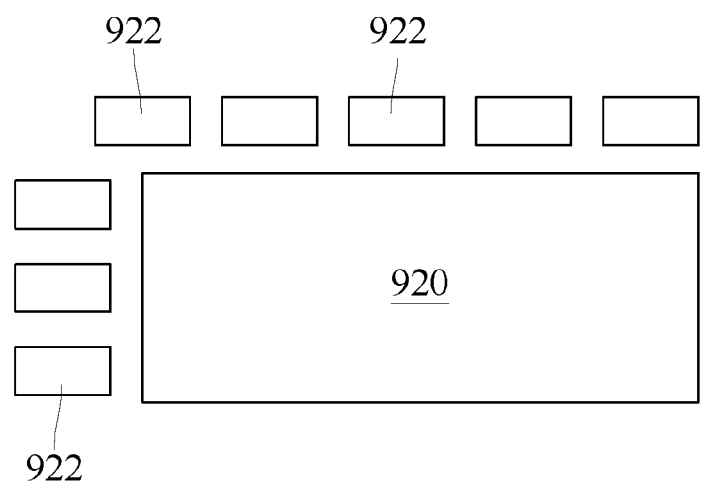
Figure 14F:
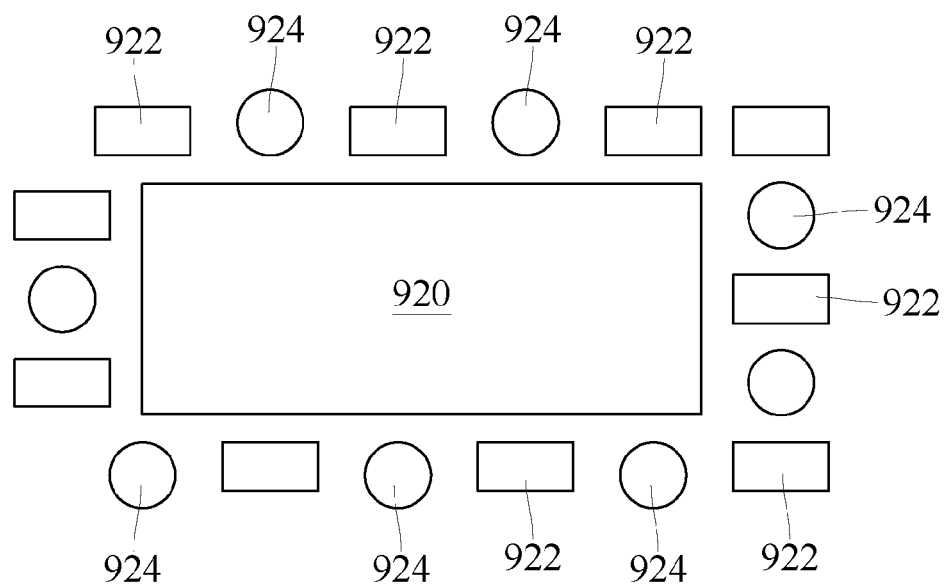

The term "expose", "exposing" or "exposed" used herein does not mean that an element or a structure is exposed in external space, but may only mean that the element or structure is not completely covered by another element that covers the element or structure. Referring to FIG. 13A to FIG. 13C. In FIG. 13A, a film layer 912 is formed on a film layer 910, a film layer 914 is deposited on the film layer 912, and a via 916 is formed on the film layer 914. A person skilled in the art may describe a relationship between the via 916 and the film layer 912 as: the via 916 "exposes" the film layer 912 or the film layer 914 "exposes" the film layer 912. Referring to FIG. 13B and FIG. 13C, in a subsequent process, a new film layer or structure (for example, a film layer 918) may cover the via 916 (as shown in FIG. 13C) or even fill the via 916 (as shown in FIG. 13B). However, this does not affect the understanding of a person skilled in the art that after the process in FIG. 13B and FIG. 13C, the via 916 still "exposes" the film layer 912 or the film layer 914 still "exposes" the film layer 912.

The term "surround" or a similar term used herein does not represent that a surrounding object must completely surround a surrounded object. For example, referring to FIG. 14A to FIG. 14F, FIG. 14A to FIG. 14F show respectively various cases in which an element 920 is "surrounded" by an element 922 and an element 924. Certainly, the applicant may also particularly exclude several aspects in the claims.

Figure 15:
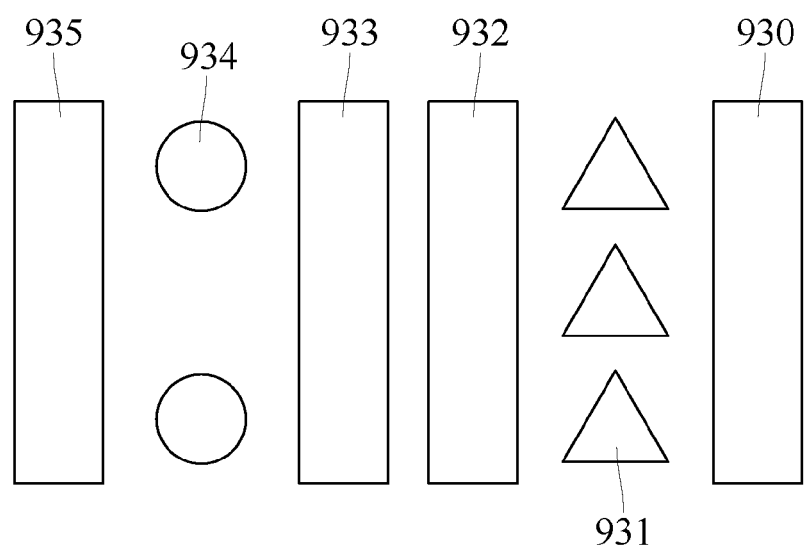
FIG. 15 shows meanings of relationships between elements according to the present invention.

The term "adjacent", "neighboring" or a similar term used herein does not represent that another intermediate element is completely absent between two "adjacent" or "neighboring" elements. For example, referring to FIG. 15, a same shape in FIG. 15 is used to represent a same object. In FIG. 15, an element 933 is adjacent to an element 935, although an element 934 of another type is additionally disposed between the elements 933 and 935. For example, the elements 933 and 935 may be two adjacent pixels, and are separated by using the element 934 being a black matrix. Similarly, the element 932 and the element 930 also have an adjacent relationship.

Figure 16:
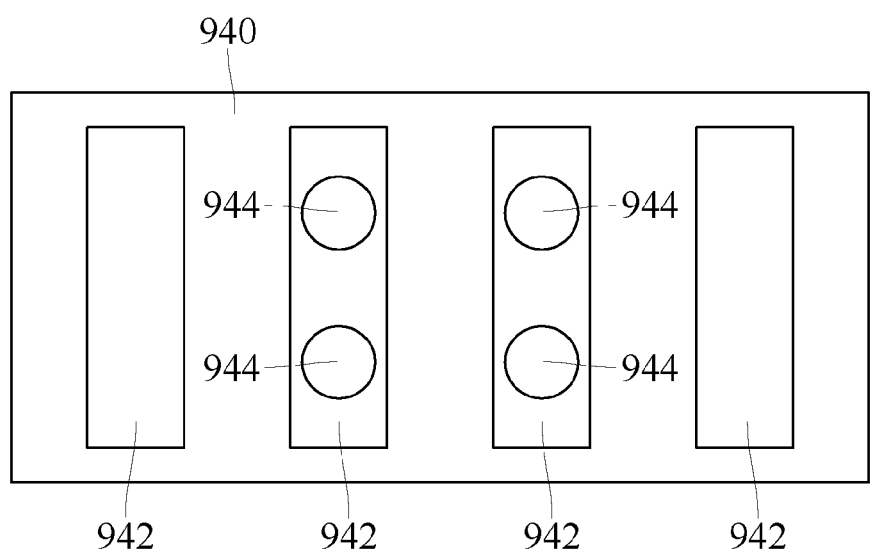
FIG. 16 shows meanings of relationships between elements according to the present invention.

The use of term "each or each of the plurality of" should be understood as follows. For example, referring to FIG. 16, an element 940 has/includes a plurality of elements 942. We can still said elements 944 is disposed on each of or each each of the plurality of element 942. This description only represents that the element 940 has two or more elements 942 (for example, two elements 942 in the center shown in the drawing), and the elements 944 is disposed on the two or more elements 942. That is, other elements 942 (for example, two elements 942 on two sides shown in the drawing) may also be disposed on the element 940.

These other elements 942 do not need to have an element 944. Certainly, the applicant may also describe another aspect in another manner of description. For example, all elements 942 on the element 940 have an element 944, which may mean that all the elements 942 should have an element 944.

Figure 2:
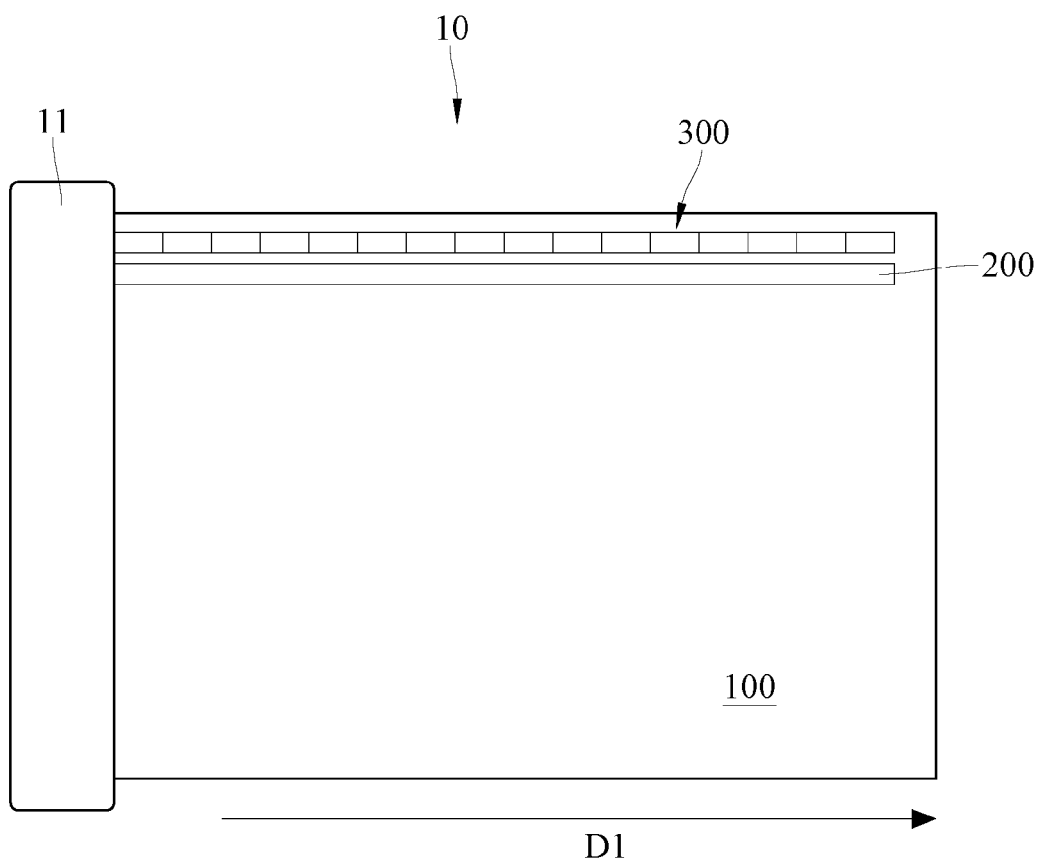
FIG. 2 is a schematic view of an operation status of a flexible display according to an embodiment of the present invention.
Figure 3:
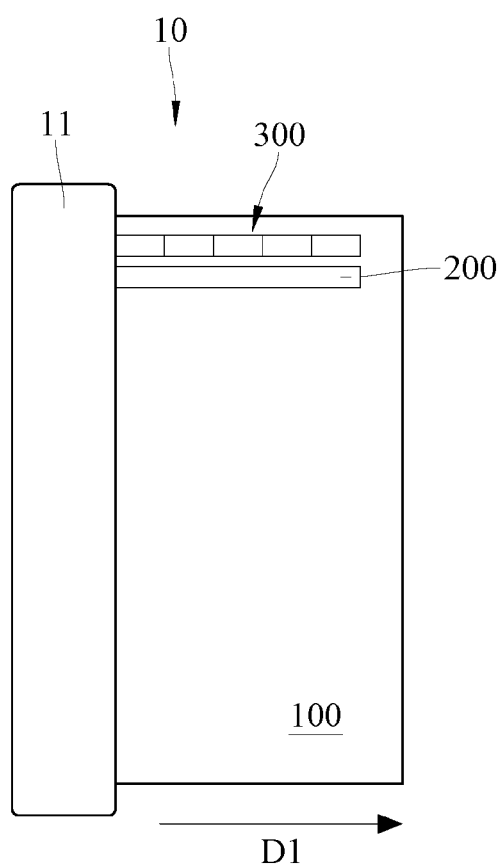
FIG. 3 is a schematic view of another operation status of a flexible display according to an embodiment of the present invention.
Figure 4:
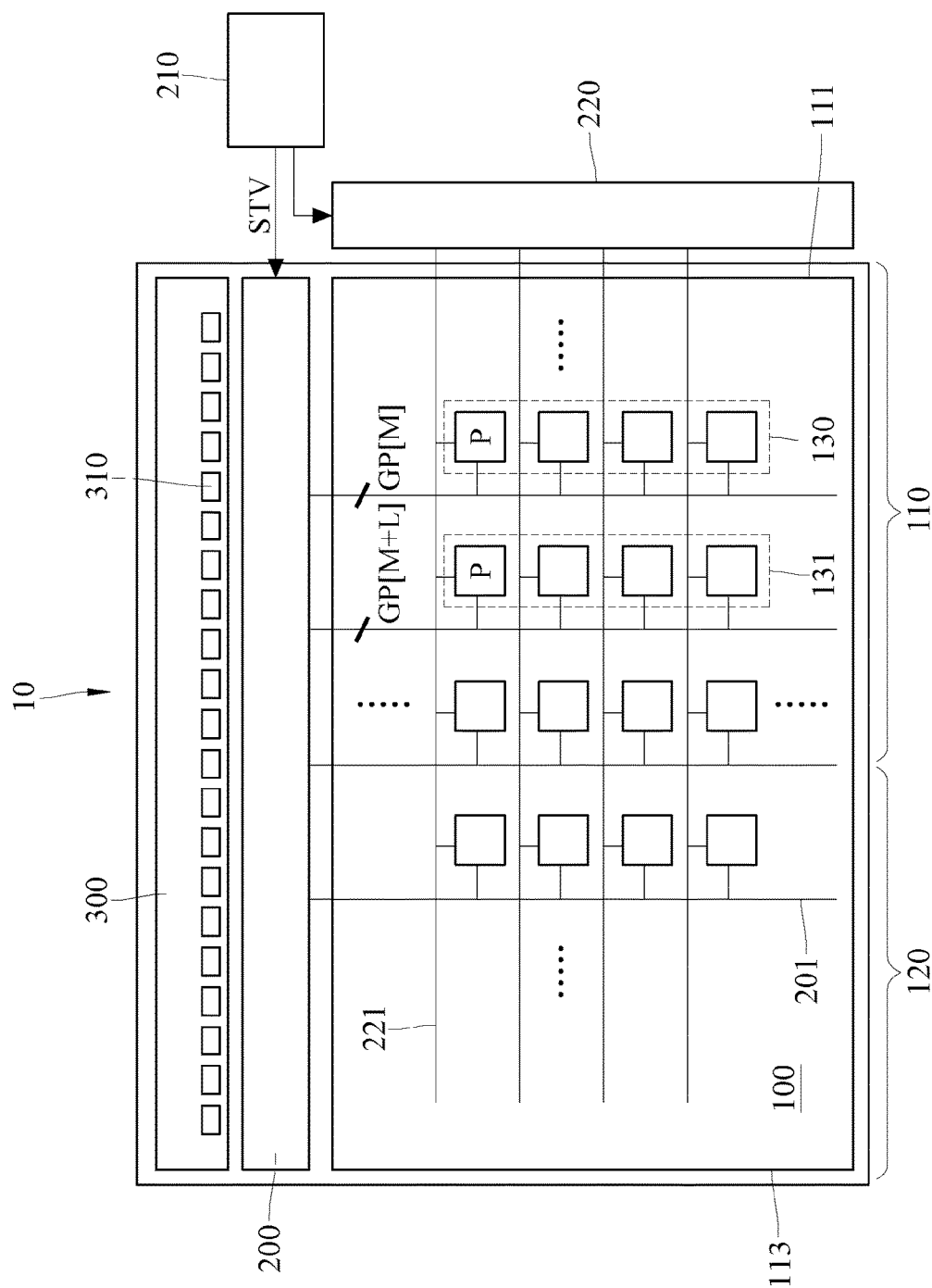
FIG. 4 is a system block diagram of a flexible display according to an embodiment of the present invention.
Figure 5:
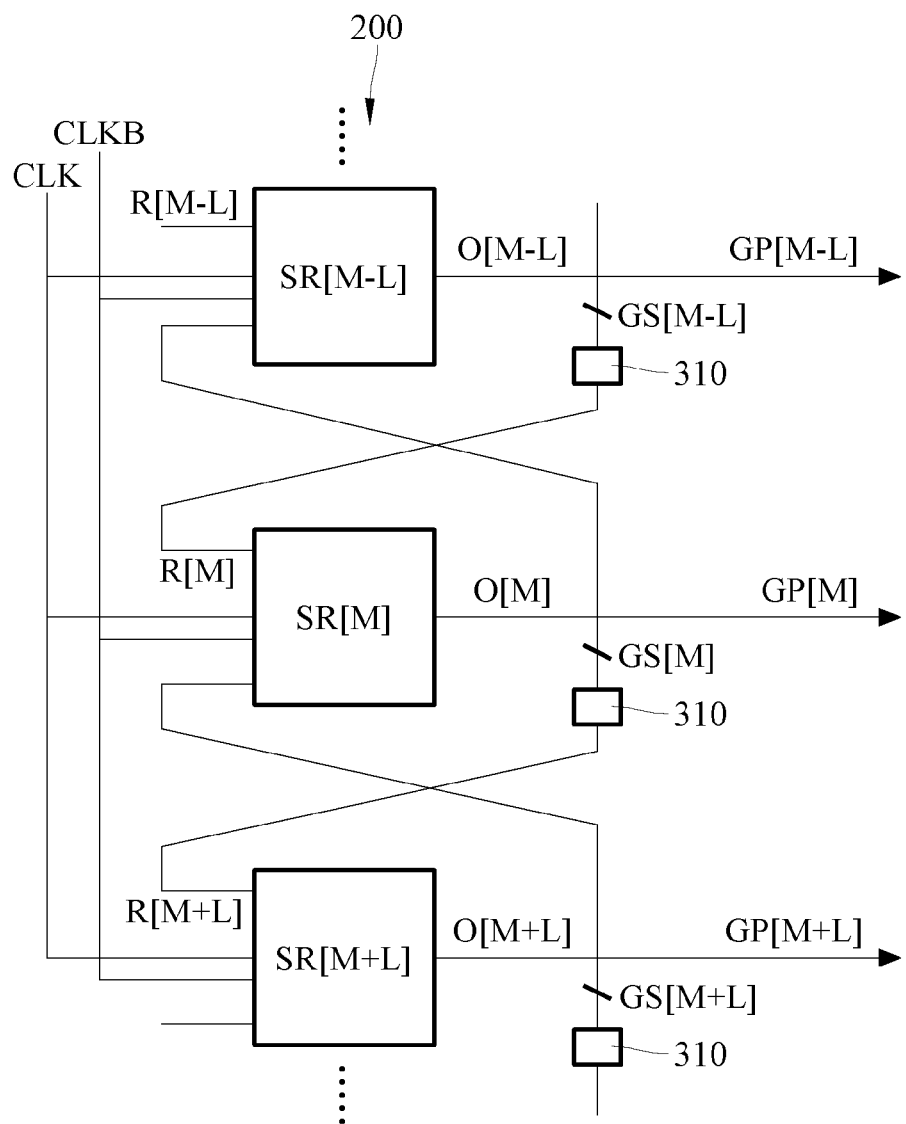
FIG. 5 is a block diagram of a gate driver and an impedance control circuitry according to an embodiment of the present invention.
Figure 6:
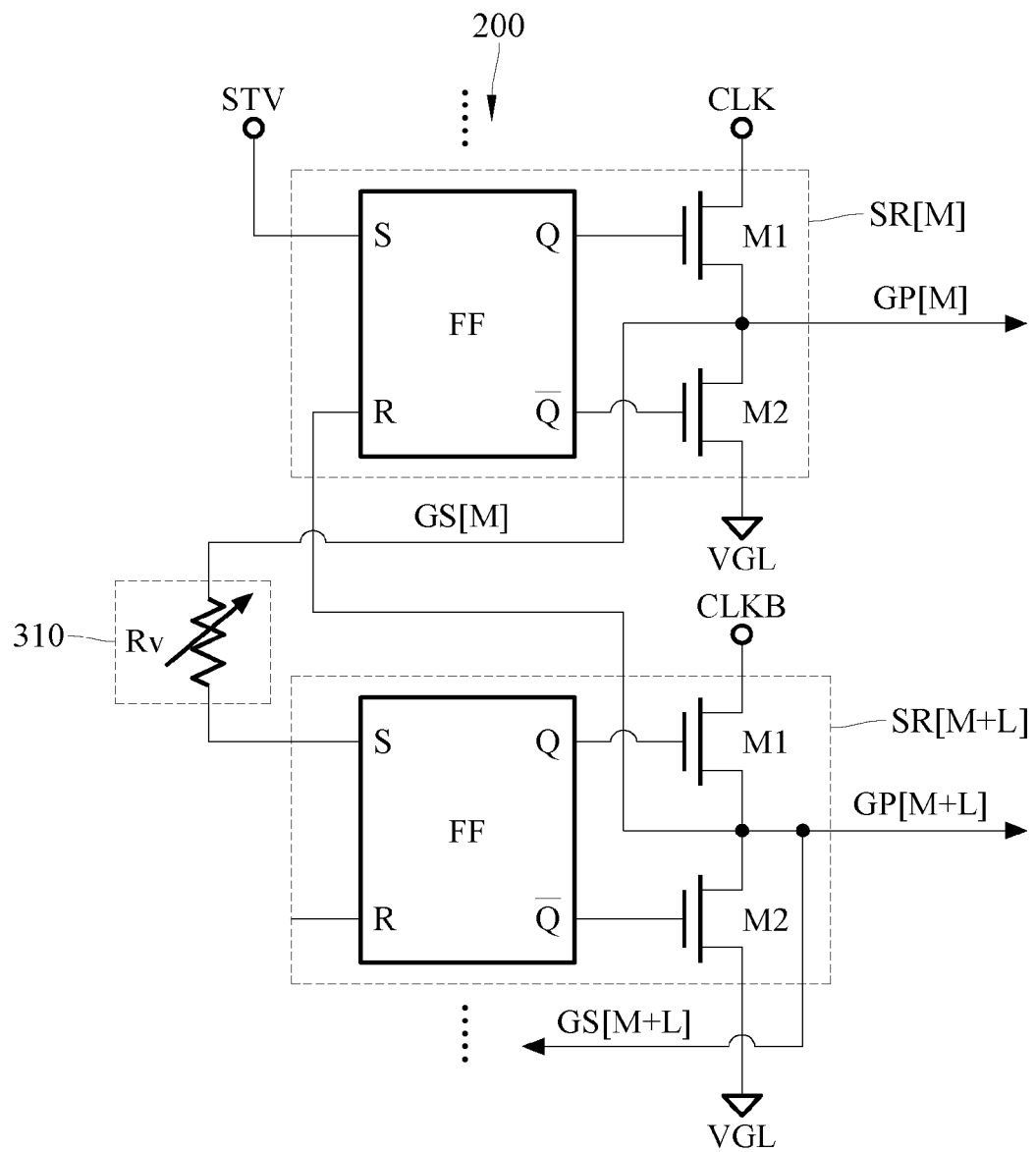
FIG. 6 is a circuit diagram of a gate driver and a bending sensing unit according to an embodiment of the present invention.
Figure 7:
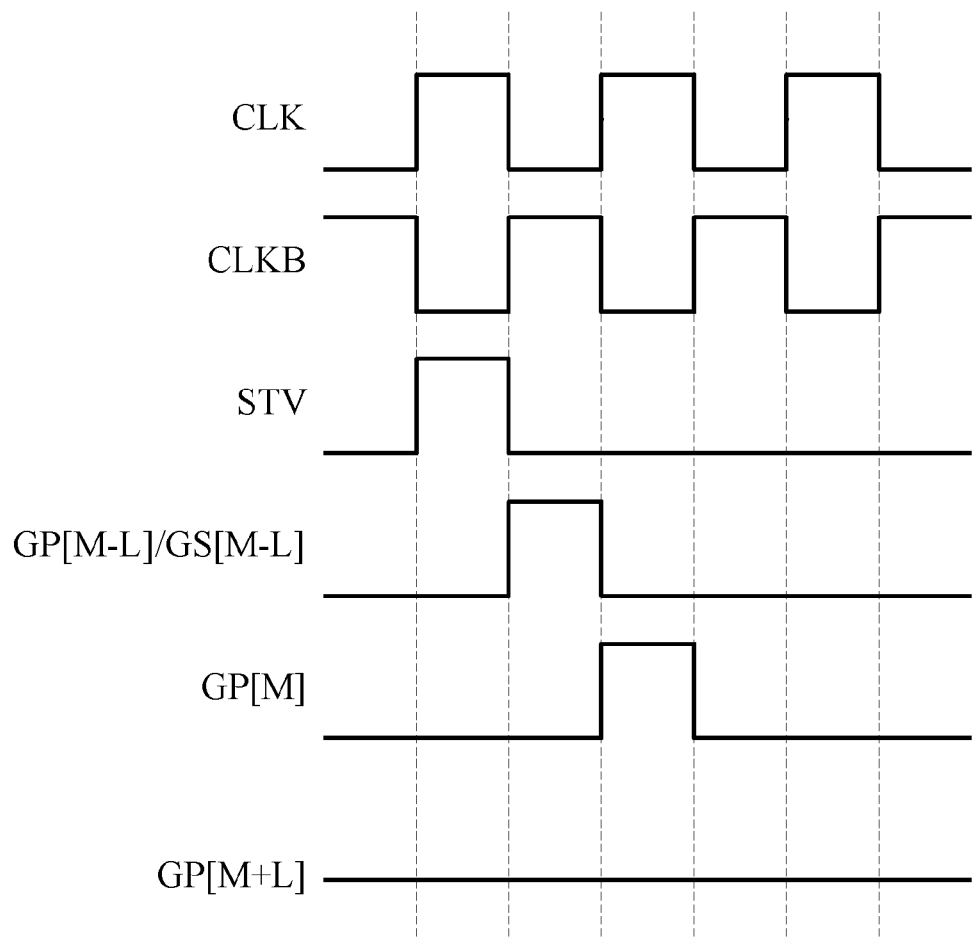
FIG. 7 is a waveform diagram of driving signals of a gate driver and a bending sensing unit according to an embodiment of the present invention.
Figure 8:
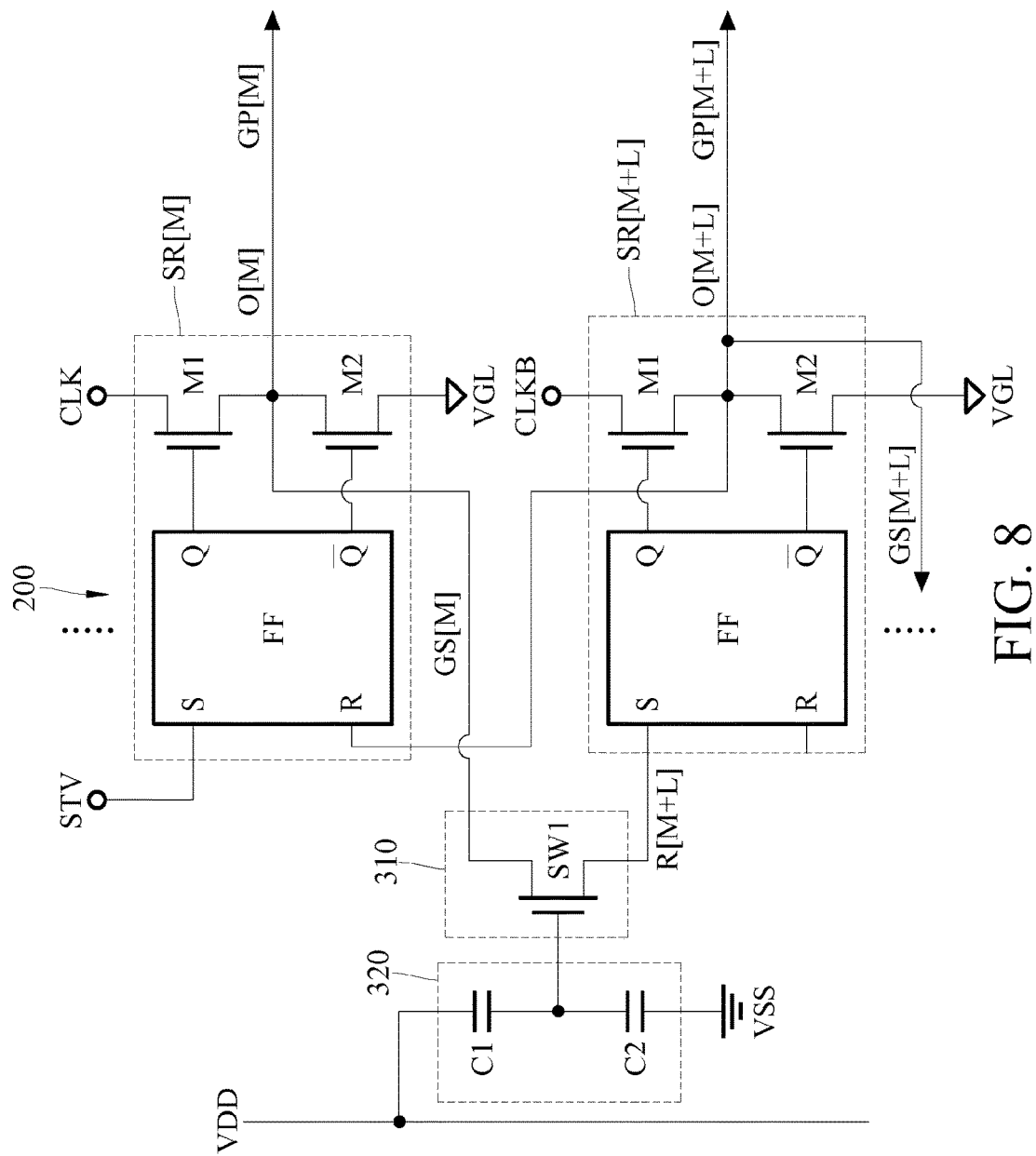
FIG. 8 is a circuit diagram of a gate driver and a bending sensing unit according to another embodiment of the present invention.
Figure 9:
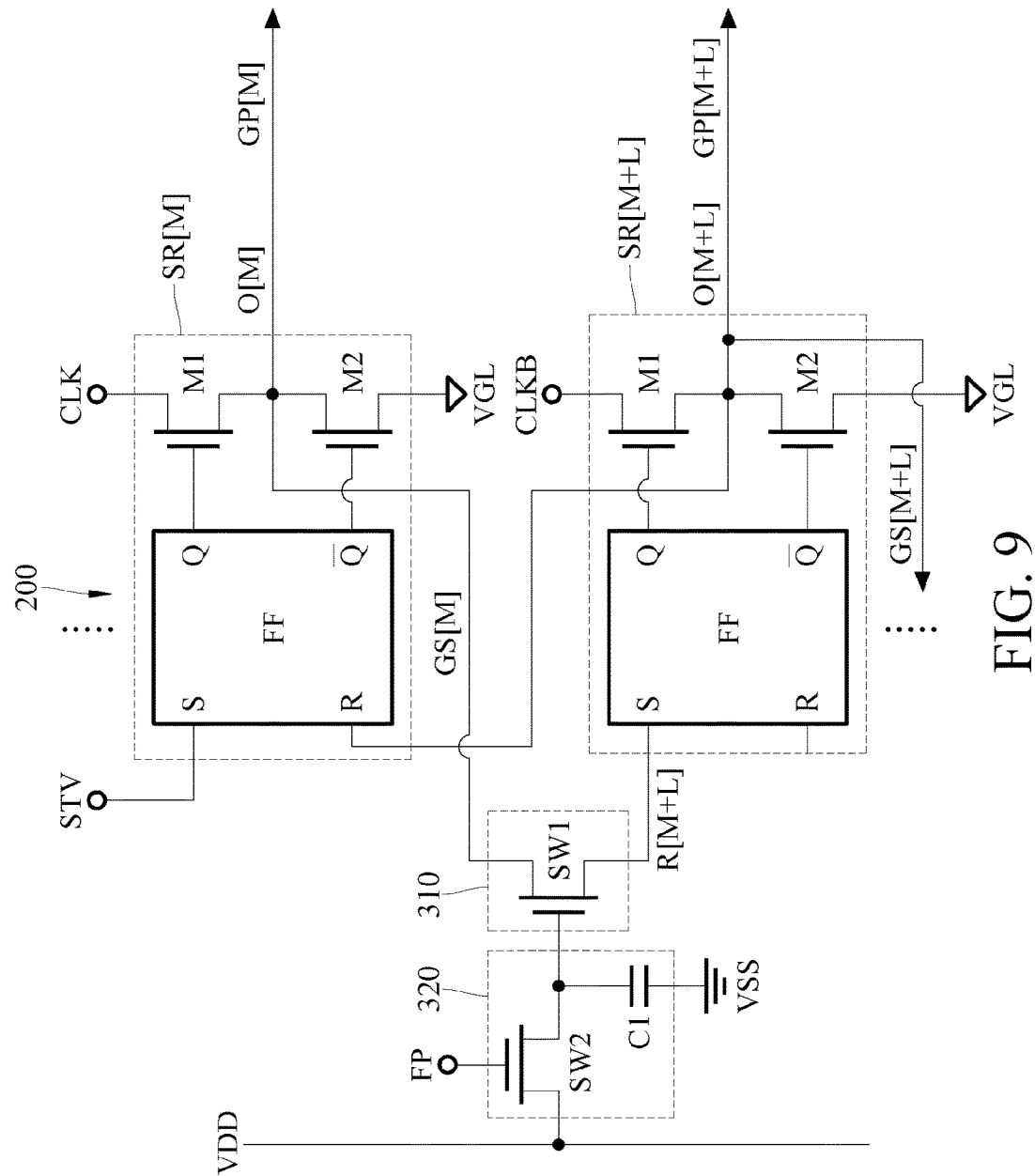
FIG. 9 is a circuit diagram of a gate driver and a bending sensing unit according to another embodiment of the present invention.
Figure 10:
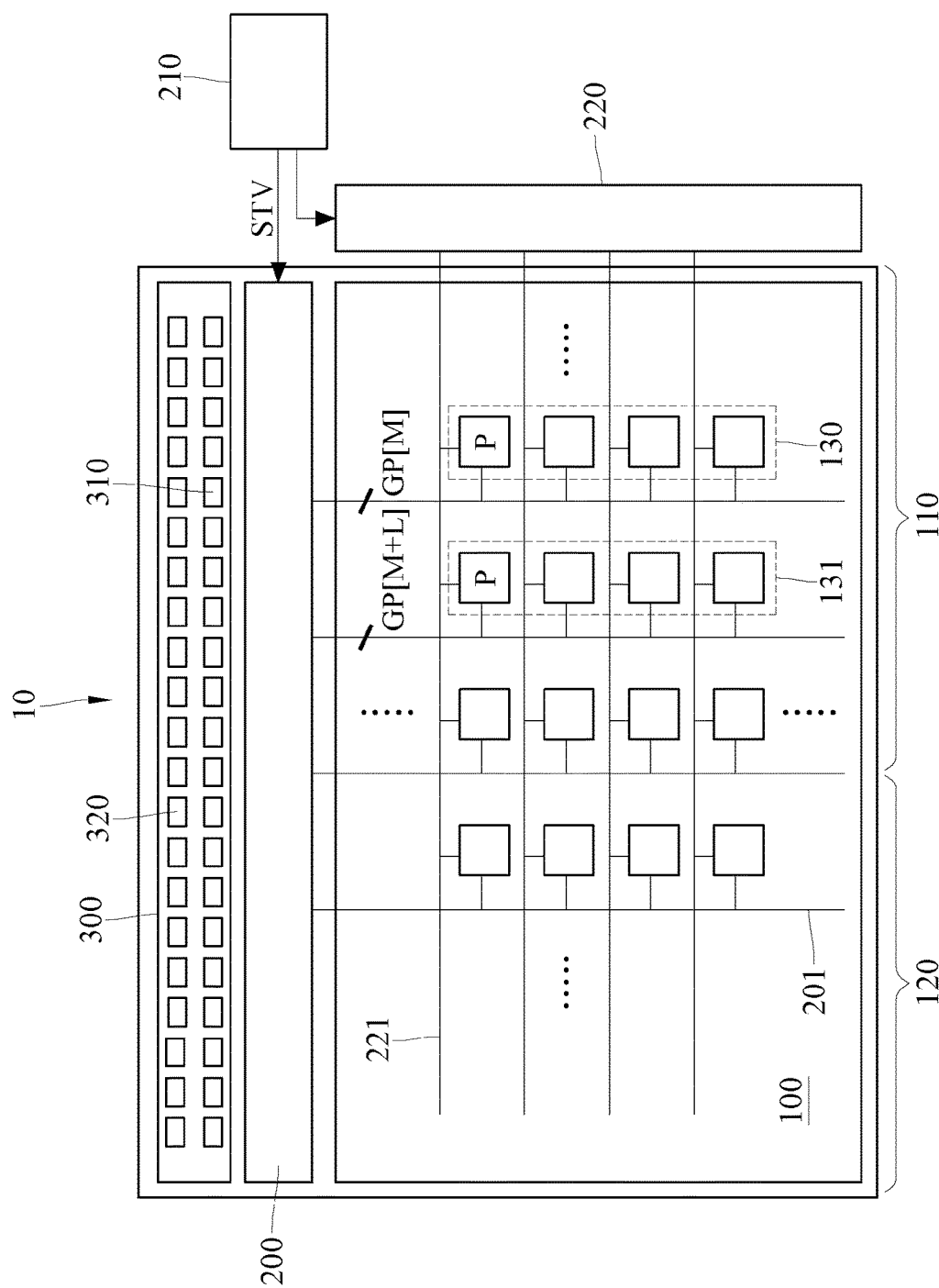
FIG. 10 is a system block diagram of a flexible display according to another embodiment of the present invention.

The embodiments of the present invention are disclosed below with reference to the accompanying drawings and text description. FIG. 1 is a perspective view of a flexible display according to an embodiment of the present invention. FIG. 2 is a schematic view of an operation status of a flexible display according to an embodiment of the present invention. FIG. 3 is a schematic view of another operation status of a flexible display according to an embodiment of the present invention. FIG. 4 is a system block diagram of a flexible display according to an embodiment of the present invention. FIG. 5 is a block diagram of a gate driver and a bending sensing unit according to an embodiment of the present invention. FIG. 6 is a circuit diagram of a gate driver and a bending sensing unit according to an embodiment of the present invention. FIG. 7 is a waveform diagram of driving signals of a gate driver and a bending sensing unit according to an embodiment of the present invention. FIG. 8 is a circuit diagram of a gate driver and a bending sensing unit according to another embodiment of the present invention. FIG. 9 is a circuit diagram of a gate driver and a bending sensing unit according to another embodiment of the present invention. FIG. 10 is a circuit diagram of a shift register according to an embodiment of the present invention.

Referring to FIG. 1, FIG. 1 shows a flexible display 10, including a display panel 100, a gate driver 200, and a bending sensing unit 300. The display panel 100 has flexibility, and therefore can be folded or bent into a curved portion 120, and a portion that is not curved or folded is defined as a non-curved portion 110. The curvature of the curved portion 120 is greater than the curvature of the non-curved portion 110, but the non-curved portion 110 is not limited to be a completely flat plane. The display panel 100 may be, for example, a liquid crystal display panel or an organic light-emitting diode display panel. In addition, the gate driver 200 and the bending sensing unit 300 are disposed on the display panel 100. The gate driver 200 can be embedded inside the display panel 100 or on the surface of the display panel 100. The bending sensing unit 300 may be on the surface of the display panel 100 or embedded inside the display panel 100. As shown in FIG. 2 and FIG. 3, the display panel 100 may be folded leftwards on the surface of the figure. Optionally, a housing 11 may further be used to house the curved display panel 100. In addition, optionally, pixels P on the curved portion 120 may be not refreshed frame by frame. In other words, in some refreshing periods, pixels P on the non-curved portion 110 are refreshed, while pixels P on the curved portion 120 are not refreshed.

Referring to FIG. 4, the display panel 100 includes an $N^{th}$ row of pixels 130 and an $(N+K)^{th}$ row of pixels 131 (in this example, K is 1). The $N^{th}$ row of pixels 130 and the $(N+K)^{th}$ row of pixels 131 separately have a plurality of pixel Ps arranged in sequence. The pixels P are configured to display corresponding grayscales to form images. Pixels P are electrically coupled to the gate driver 200 and the source driver 220. The gate driver 200 is electrically coupled to corresponding pixels P through a scan line 201, and provides refreshing pulses GP to the pixels P in sequence through the scan lines 201, to enable the pixels P, so that the pixels P receive refreshed data. The source driver 220 is electrically coupled to corresponding pixels P through data lines 221, and provides data signals to the corresponding pixels P through the data lines 221, to further control grayscales of the pixels P.

Referring to FIG. 5, the gate driver 200 has an $M^{th}$ stage of shift register circuitry SR[M] and an $(M+L)^{th}$ stage of shift register circuitry SR[M+L]. In this example, L equals 1. The $M^{th}$ stage of shift register circuitry is electrically coupled to the $N^{th}$ row of pixels 130 and have an output terminal O[M]. The output terminal O[M] is configured to output a trigger pulse GS[M] to the $(M+L)^{th}$ stage of shift register circuitrySR[M+L] to enable the $(M+L)^{th}$ stage of shift register circuitrySR[M+L]. In other words, the $(M+L)^{th}$ stage of shift register circuitrydefine, according to whether the trigger pulse GS[M] is received, a moment of outputting a refreshing pulse GP[M+L]. The $(M+L)^{th}$ stage of shift register circuitry SR[M+L] is electrically coupled to the $M^{th}$ stage of shift register circuitry SR[M] and the $(N+K)^{th}$ row of pixels 131. The $(M+L)^{th}$ stage of shift register circuitry SR[M+L] has a receiving terminal R[M+L] configured to receive the trigger pulse GS[M]. The $(M+L)^{th}$ stage of shift register circuitry SR[M+L] is further configured to output the refreshing pulse GP[M+L] according to the trigger pulse GS[M] to refresh the $(N+K)^{th}$ row of pixels 131. N, M, L, and K in the foregoing are positive integers. For example, L and K are 1.

The bending sensing unit 300 is electrically coupled to the gate driver 200 and is disposed at the display panel 100. For example, the bending sensing unit 300 may be an electronic element (for example, a transistor, a pixel electrode, a common electrode or a signal line) that is externally attached at the circumference of the display panel 100 or connected to the display panel 100, and is manufactured together by using a semiconductor process and inserted in the panel 100. The bending sensing unit 300 includes at least one impedance control circuitry 310. The impedance control circuitry 310 has different impedances (or resistances) according to bending of the display panel 100. As shown in FIG. 5, the impedance control circuitry 310 is electrically coupled between the output terminal O[M] and the receiving terminal R[M+L]. In addition, the plurality of stages of shift register circuitries usually may have the same or similar circuit structures and connection relationships. Therefore, the circuit structures and external connection relationships of the stages of the shift register circuitries may be disposed repeatedly by using the $M^{th}$ stage of shift register circuitry SR[M], an $(M-L)^{th}$ stage of shift register circuitry SR[M-L], and the $(M+L)^{th}$ stage of shift register circuitry SR[M+L] as a template.

In other words, the flexible display 10 includes the display panel 100, the gate driver 200, and the bending sensing unit 300. The display panel 100 has a plurality of rows of pixels 130, 131 arranged in sequence. Each row of pixels has a plurality of pixels P. The gate driver 300 has a plurality of stages of shift register circuitries SR electrically coupled to each other in sequence. The shift register circuitries SR are respectively electrically coupled to the corresponding row of pixels 130, 131, and are configured to provide a plurality of refreshing pulses GP, to respectively drive the corresponding rows of pixels 130, 131 to be refreshed. The shift register circuit SR is further configured to provide the trigger pulse GS to drive the other stage of the shift register circuitries, to enable the other stage of the shift register circuitries to generate one of the plurality of refreshing pulses GP. The bending sensing unit 300 is electrically coupled to the gate driver 200. The bending sensing unit 300 is configured to control, according to the bending of the display panel 100, the impedance of a path used by at least one of the stages of the shift register circuitries SR to transmit the trigger pulse GS to the other stage of the shift register circuitries SR.

In addition, referring to FIG. 4, the plurality of stages of shift register circuitries SR of the gate driver 200 are arranged in sequence from a tail end 111 of the non-curved portion 110 of the display panel 100 towards a tail end 113 of the curved portion 120 of the display panel 100. The flexible display 10 further includes a control circuit 210. The control circuit 210 may be, for example, a timing controller. The control circuit 210 is electrically coupled to the gate driver 200. The control circuit 210 is configured to provide an initial pulse STV to the gate driver 200. The initial pulse STV may enable the plurality of stages of shift register circuitries SR so that the plurality of stages of shift register circuitries SR generate the refreshing pulses GP in sequence starting from the shift register circuit SR at the tail end 111 of the non-curved portion, to further refresh the rows of pixels 130, 131 in sequence. The control circuit 210, the gate driver 200, and the source driver 220 may be implemented by using hardware such as field-programmable gate array (FPGA), an application-specific integrated circuit (ASIC) or a microcontroller unit (MCU) with or without software/firmware. When the initial pulse STV triggers the gate driver 200 to start refreshing of the rows of pixels 130, 131, the shift register circuitries SR also generate the trigger pulses GS in sequence. At a position where the display panel 100 is bent (for example, starting from a boundary between the non-curved portion 110 and the curved portion 120), the bending sensing unit 300 may increase the impedance of the transmission path of the trigger pulse GS, to prevent the trigger pulse GS of the non-curved portion 110 from being successfully transmitted into the curved portion 120, to further interrupt stage-by-stage driving operations of the shift register circuitries SR, so as to further disable refreshing of pixels P of the shift register circuit SR in the bent area.

In other words, the impedance control circuitry 310 in the bending sensing unit 300 has different impedances according to a bending degree of the display panel, so that transmission of the trigger pulse GS between the shift register circuitries SR can be controlled. Therefore, a plurality of stages of shift register circuitries that are connected in series can be disabled and not triggered, so as to stop refreshing of particular pixels P on the display panel 100, thereby achieving an effect of reducing power consumption.

Referring to FIG. 6, according to this embodiment, the impedance control circuitry 310 includes a variable resistor Rv. The variable resistor Rv has different impedances according to the bending of the display panel 100. A terminal of the variable resistor Rv is electrically coupled to the output terminal O[M]. The other terminal of the variable resistor is electrically coupled to the receiving terminal R[M+L]. The variable resistors Rv in the impedance control circuitry 310 may be arranged in sequence on a side of the display panel 100. For example, as shown in FIG. 4, the variable resistors Rv may be arranged in sequence along a side, parallel to a long side, of the display panel 100, and may be arranged in sequence starting from an edge of a short side of the display panel 100 to extend to an edge of the other short side of the display panel 100. In this case, the variable resistors Rv are respectively disposed at the curved portion 120 and the non-curved portion 110 of the display panel 100. It should be noted there that the curved portion 120 of the display panel 100 in FIG. 6 is laid flat for ease of description. Referring to FIG. 6 again, the variable resistor Rv in FIG. 6 is one of the variable resistors on the display panel 100, and a resistance value of the variable resistor Rv may be changed according to a degree of bending of location of the display panel 100 where the variable resistor Rv is located. The variable resistor Rv is connected in series to form a path used by the $M^{th}$ stage of the shift register circuitry SR[M] to transmit the trigger pulse GS[M] to the $(M+L)^{th}$ stage of the shift register circuitry SR[M+L]. When a stress is generated on the variable resistor Rv because the display panel 100 is folded, the impedance of the variable resistor Rv significantly increases, which prevents the $M^{th}$ stage of shift register circuitry SR[M] from transmitting the trigger pulse GS[M] to the $(M+L)^{th}$ stage of shift register circuitry SR[M+L]. Therefore, the $(M+L)^{th}$ stage of shift register circuitry SR[M+L] cannot receive the trigger pulse GS[M], and further do not generate the refreshing pulse GP[M+L] and a trigger pulse GS[M+L] according to the trigger pulse GS[M]. In other words, the $(M+L)^{th}$ stage of shift register circuitry SR[M+L] and the subsequent stages of the shift register circuitry thereof are not triggered, so that a refreshing action is not generated for the pixels P electrically coupled to the subsequent stages of the shift register circuitry.

In addition, the shift register circuitry may include a flip flop FF, a transistor M1, and a transistor M2. The FF may be, for example, an RS OF. An input terminal labeled S is configured to receive the trigger pulse, for example, the trigger pulse GS[M+L] provided to a previous stage of the shift register circuitries, or the trigger pulse STV provided to the system of the display panel 100. An input terminal labeled R is configured to receive the refreshing pulse provided to a next stage of the shift register circuitries. A gate of the transistor M1 is configured to receive a signal provided by the output terminal Q of the RS OF. A terminal of the transistor M1 is configured to receive a clock signal CLK or a clock signal CLKB. The other terminal of the transistor M1 is electrically coupled to a terminal of the transistor M2. In this example, the stages of the shift register circuitries alternately receive the clock signal CLK or the clock signal CLKB, where the clock signal CLK and the clock signal CLKB have inverse phases. A terminal of the transistor M2 is electrically coupled to the transistor M1, the other terminal of the transistor M2 is configured to receive a reference voltage VGL, and a gate terminal of the transistor M2 is configured to receive the signal provided by the output terminal $\overline{Q}$ of the RS FF.

Referring to FIG. 7, in FIG. 7, the trigger signal STV triggers an $(M-L)^{th}$ stage of the shift register circuitry SR[M−L] so that the $(M-L)^{th}$ stage of the shift register circuitry SR[M−L] generates a corresponding refreshing signal GP[M−L] and a trigger signal GS[M−L]. The refreshing signal GP[M−L] is used to control a pixel P to refresh, and the trigger signal GS[M−L] subsequently triggers the $M^{th}$ stage of shift register circuitry SR[M], so that the $M^{th}$ stage of shift register circuitry SR[M] generates a corresponding refreshing signal GP[M] and a trigger signal GS[M]. However, because of the impedance of the variable resistor Rv, when curving occurs at the position of the variable resistor Rv, the trigger signal GS[M] cannot be transmitted to the $(M+L)^{th}$ stage of shift register circuitry SR[M+L], or the trigger signal GS[M] has been attenuated during transmission and can no longer normally trigger the $(M+L)^{th}$ stage of shift register circuitrySR[M+L]. Therefore, as shown in the figure, the refreshing signal GP[M+L] does not have an significant pulse.

In other words, the bending sensing unit 300 has a plurality of the variable resistors Rv. The variable resistors Rv have different impedances according to the bending of the display panel 100. A terminal of each variable resistor Rv is electrically coupled to the output terminal O of one of the stages of the shift register circuitries SR. The other terminal of each variable resistor Rv is electrically coupled to the receiving terminal R of the other stage of the shift register circuitries. The output terminal O is configured to provide the trigger pulse GS, to trigger the other stage of the shift register circuitries. The receiving terminal R is configured to receive the trigger pulse GS, to generate the refreshing pulse GP and the trigger pulse GS according to the trigger pulse GS. Similar to the impedance control circuitries 310, the variable resistors Rv are also arranged in sequence on a side of the display panel 100. An extending axial direction in which the variable resistors Rv are arranged is approximately parallel to an extending axial direction D1 in which the non-curved portion 110 of the display panel 100 extends outwards from the curved portion 120 of the display panel 100.

Referring to FIG. 8, in FIG. 8, the impedance control circuitry 310 has a first switch SW1. The first switch SW1 has a first terminal, a second terminal, and a control terminal (for example, a gate terminal of a transistor). The first terminal is electrically coupled to the output terminal O[M] of the $M^{th}$ stage of shift register circuitries SR[M]. The second terminal is electrically coupled to the receiving terminal R[M+L] of the $(M+L)^{th}$ stage of shift register circuitries SR[M+L]. The bending sensing unit 300 further has impedance control circuitries 320. The impedance control circuitries 320 are electrically coupled to the impedance control circuitries 310. In addition, the impedance control circuitries 320 may be further electrically coupled to the control terminals of the first switches SW1 and have a first capacitor C1. The impedance control circuitries 320 are configured to change a capacitance value of the first capacitor C1 according to sensed pressure to control the voltage potential of the control terminal of the first switch SW1, to further control the first terminal of the first switch SW1 and the second terminal of the first switch SW1 to be conducted or cut off. In particular, the first capacitor C1 may be embedded inside the display panel 100 or attached on the surface of the display panel 100. When the display panel 100 is bent or curved, a distance between two electrodes of the first capacitor C1 changes along with a deformation of the display panel 100 at a position where the first capacitor C1 is disposed. For example, the distance between the two electrodes of the first capacitor C1 is shortened, and hence it further increases a capacitance value of the first capacitor C1. The foregoing change of capacitance value and another circuit of the bending sensing unit 300 may be combined to control the first switch SW1 to be turned on or turned off. When the first switch SW1 is turned on, the trigger pulse GS[M] may be transmitted to the $(M+L)^{th}$ stage of shift register circuitries SR[M+L]. When the first switch SW1 is turned off, the trigger pulse GS[M] cannot be transmitted to the $(M+L)^{th}$ stage of shift register circuitries SR[M+L], or is significantly attenuated during transmission and can no longer successfully trigger the $(M+L)^{th}$ stage of shift register circuitries SR[M+L].

In other words, the bending sensing unit 300 has a plurality of first capacitors C1. The first capacitors C1 have different capacitance values according to the bending of the display panel 100, to further control the impedance of a transmission path used by one of the plurality of stages of shift register circuitries SR to transmit the trigger pulse GS to the other stage of the shift register circuitries SR. In addition, the first capacitors are arranged in sequence on a side of the display panel 100. An extending axial direction in which the first capacitors C1 are arranged is approximately parallel to an extending axial direction D1 in which the non-curved portion 110 of the display panel 100 extends outwards from the curved portion 120 of the display panel 100.

In particular, as shown in FIG. 8, the pressure-sensitive circuit 320 further has a second capacitor C2. A first terminal of the first capacitor C1 is configured to receive a first reference voltage VDD. A second terminal of the first capacitor C1 is electrically coupled to a first terminal of the second capacitor C2 and the control terminal of the first switch SW1. A second terminal of the second capacitor C2 is configured to receive a second reference voltage VSS. The second capacitor C2 and the first switch SW1 may be disposed together in the display panel 100 by using a semiconductor process at the same time when the pixels P and a circuit around the pixels P are manufactured. The second capacitor C2 approximately has a constant capacitance value. Because the first terminal of the first capacitor C1 is configured to receive the first reference voltage VDD, the first reference voltage VDD may be a direct current voltage or a pulse that changes periodically. When a pulse is generated in the first reference voltage VDD, by means of coupling of a capacitor, the voltage of the control terminal of the first switch SW1 may be represented as:

$$VDD \times \frac{C2}{C1 \times C2},$$

where in the equation, VDD is a voltage value of the first reference voltage VDD, C2 is a capacitance value of the second capacitor, and C1 is a capacitance value of the first capacitor C1. Therefore, when the capacitance value of the first capacitor C1 increases because of the bending of the display panel 100, the voltage of the control terminal of the first switch SW1 decreases because of voltage division, and further decreases to a voltage potential that cannot turn on the first switch SW1. Therefore, the trigger pulse GS[M] cannot be transmitted to the $(M+L)^{th}$ stage of shift register circuitries SR[M+L], or is significantly attenuated during transmission and can no longer successfully trigger the $(M+L)^{th}$ stage of shift register circuitries SR[M+L]. However, when the display panel 100 is slightly bent and the capacitance value of the first capacitor C1 is relatively small, the voltage of the first switch SW1 has relatively high voltage potential and falls at a voltage voltage potential that can turn on the first switch SW1. Therefore, the first switch SW1 is in a turned-on state, and the trigger pulse GS[M] can be transmitted to the $(M+L)^{th}$ stage of shift register circuitries SR[M+L].

Referring to FIG. 9, the impedance control circuitry 310 has the first switch SW1. The first switch SW1 has a first terminal, a second terminal, and a control terminal (for example, a gate terminal of a transistor). The first terminal of the first switch SW1 is electrically coupled to the output terminal O[M] of the $M^{th}$ stage of shift register circuitries SR[M]. The second terminal of the first switch SW1 is electrically coupled to the receiving terminal R[M+L] of the $(M+L)^{th}$ stage of shift register circuitries SR[M+L]. The bending sensing unit 300 further has the impedance control circuitries 320. The impedance control circuitries 320 are electrically coupled to the impedance control circuitry 310. In addition, the impedance control circuitries 320 may be further electrically coupled to the control terminal of the first switch SW1 and have the first capacitor C1. The impedance control circuitries 320 are configured to change the capacitance value of the first capacitor C1 according to sensed pressure to control the voltage potential of the control terminal of the first switch SW1, to further control the first terminal of the first switch SW1 and the second terminal of the first switch SW1 to conducted or cut off. In particular, the pressure-sensitive circuit 320 further has a second switch SW2. A first terminal of the second switch SW2 is configured to receive a first reference voltage VDD. A second terminal of the second switch SW2 is electrically coupled to a first terminal of the first capacitor C1 and the control terminal (for example, a gate terminal) of the first switch SW1. A control terminal (for example, a gate terminal) of the second switch SW2 is configured to receive a control signal FP. A second terminal of the first capacitor C1 is configured to receive a second reference voltage VSS. In addition, the second switch SW2 is controlled by the control signal FP to be turned on periodically. During a period in which the second switch SW2 is turned on, the voltage potential of the first terminal of the first capacitor C1 is charged by the first reference voltage VDD through the second switch SW2. The voltage potential of the first terminal of the first capacitor C1 may be represented as $$V = \frac{I \times \Delta T}{C},$$

where V is the voltage potential at the first terminal of the first capacitor C1, I is a current that charges the first capacitor C1 through the second switch SW2, C is the capacitance value of the first capacitor C1, and ΔT is a time during which the second switch SW2 is turned on. According to this, it may be known that when a distance between two electrodes of the first capacitor C1 decreases because of the bending of the display panel 100, the capacitance value C of the first capacitor C1 increases accordingly, and further the voltage potential V of the first terminal of the first capacitor C1 decreases. Therefore, a degree to which the first switch SW1 is turned on decreases, or cannot be normally turned on, so that the trigger pulse GS[M] cannot be transmitted to the (M+L)$^{th}$ stage of shift register circuitries SR[M+L], or is significantly attenuated during transmission and can no longer successfully trigger the (M+L)$^{th}$ stage of shift register circuitries SR[M+L]. In contrast, when the capacitance value C of the first capacitor C1 is relatively small, the voltage potential V of the first terminal of the first capacitor C1 is relatively high. Therefore, the first switch SW1 may be normally turned on to enable the trigger pulse GS[M] to be transmitted to the (M+L)$^{th}$ stage of shift register circuitries SR[M+L]. Other elements and signals of the circuit shown in FIG. 9 have operations and structures the same as those of the circuit shown in FIG. 8, and are no longer otherwise elaborated.

Referring to FIG. 10 again, the display panel 100 has the non-curved portion 110 and the curved portion 120. The curvature of the curved portion 120 is greater than the curvature of the non-curved portion 110. The impedance control circuitries 320 are respectively disposed at the curved portion 120 and the non-curved portion 110. The capacitance value of the first capacitor C1 disposed at the curved portion 120 is greater than the capacitance value of the first capacitor C1 disposed at the non-curved portion 110. In other words, as shown in FIG. 10, after the display panel 100 is curved to form the curved portion 120, the curvature of the curved portion 120 is greater than the curvature of the non-curved portion 110, so that the distance between the two electrodes of the first capacitor C1 further decreases. Therefore, the first capacitor C1 disposed at the curved portion 120 has a relatively large capacitance value.

Figure 11:
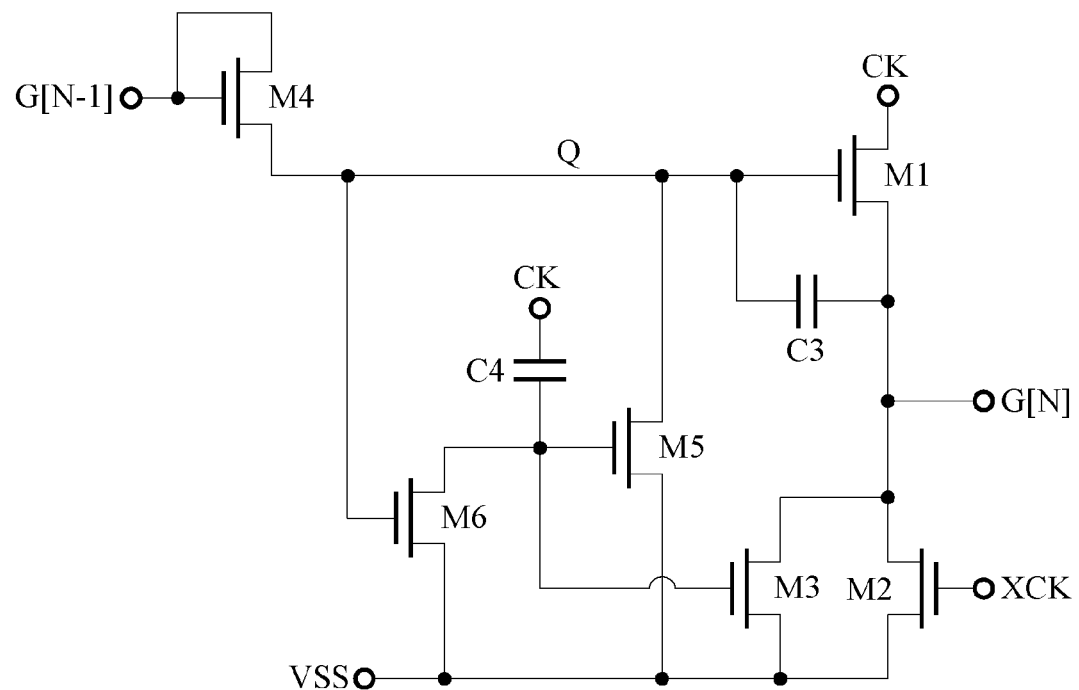
FIG. 11 is a circuit diagram of a shift register according to another embodiment of the present invention.
Figure 12:
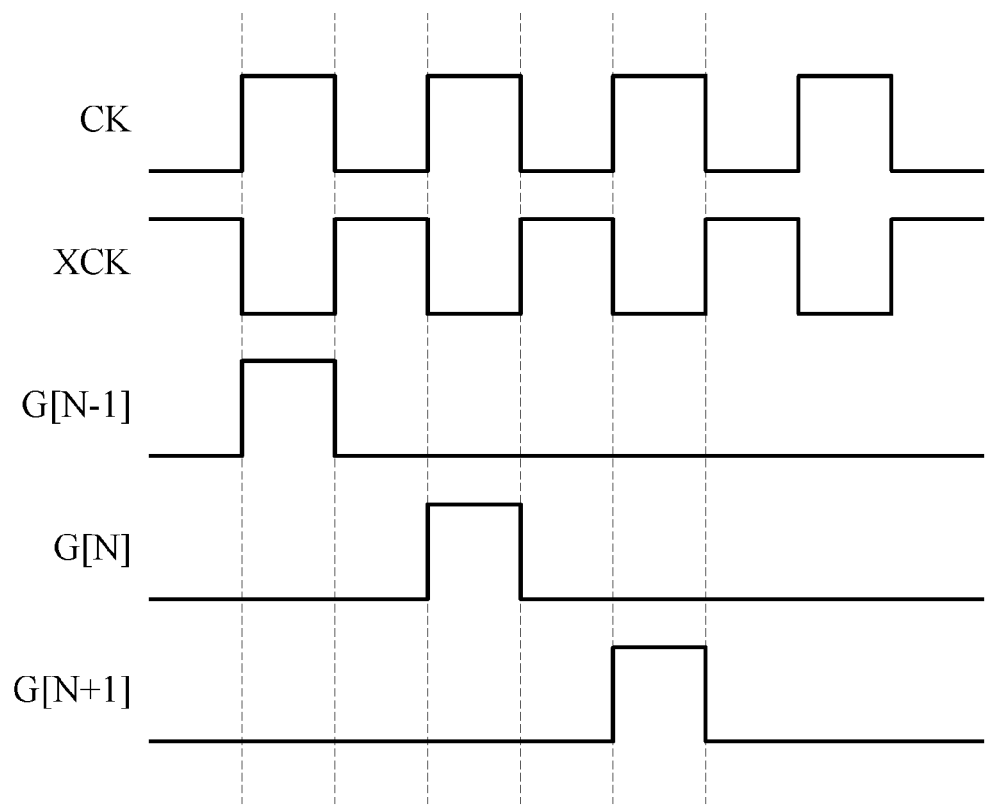
FIG. 12 is a waveform diagram of a shift register circuitry according to another embodiment of the present invention.

Referring to FIG. 11, FIG. 11 is a schematic view of one of the stages of the shift register circuitries 203 of a shift register 200 according to another embodiment. In the present invention, other existing shift register circuitries design may be used. According to the bending of the display panel 100, the impedance of a path used by a shift register circuitry to transmit a trigger signal is controlled. In the shift register circuitry 203, a transistor M4 is configured to receive a trigger signal G[N−1] (corresponding to the trigger signal GS in the foregoing embodiment) of a previous stage of shift register circuitries, a control terminal Q is further increased to a high voltage potential. After a clock signal CK is increased to a high voltage potential, the transistor M1 outputs a refreshing signal/trigger signal G[N]. The refreshing signal/trigger signal G[N] is respectively provided to a next stage of the shift register circuitries and pixels, to trigger the next stage of the shift register circuitries and the pixels to refresh. A transistor M2 is configured to pull down an output terminal of the shift register circuitry 203 according to a clock signal XCK. A transistor M3 and a transistor M5 are respectively used to stabilize the voltage potential of the control terminal Q and the voltage potential of the output terminal in a period in which a stage of the shift register circuitries 203 other than the current stage of shift register circuitries 203 are enabled. A transistor M6 is configured to control the transistor M3 and the transistor M5 according to the voltage potential of the control terminal Q, so as to disable the transistor M3 and the transistor M5 in a period in which the current stage of the shift register circuitries 203 are enabled. A path used by the shift register circuit 203 to transmit the trigger signal G[N] to a next stage of shift register circuitries and the foregoing impedance control circuitry 310 may be combined to further determine whether to continue to enable the path of the next stage of shift register circuitries. In other words, the shift register circuitry 203 may replace the shift register circuitry SR in the foregoing embodiment. FIG. 12 shows a corresponding waveform of the shift register circuitry 203. The clock signal CK and the clock signal XCK have inverse phases. G[N−1], G[N], and G[N+1] are respectively refreshing signals/trigger signals of three stages of the shift register circuitries.

In conclusion, an impedance control circuitry has different impedances according to bending of a display panel, so that transmission of a trigger pulse between shift register circuitries can be controlled. Therefore, a plurality of stages of shift register circuitries that are connected in series can be disabled and not triggered, so as to stop refreshing of a particular pixel on the display panel, thereby achieving an effect of reducing power consumption.

What is claimed is:
1. A flexible display, comprising:
a display panel, comprising an N$^{th}$ row of pixels and an (N+K)$^{th}$ row of pixels;
a gate driver, having an M$^{th}$ stage of shift register circuitries and an (M+L)$^{th}$ stage of shift register circuitries, wherein the M$^{th}$ stage of shift register circuitries is electrically coupled to the N$^{th}$ row of pixels and has an output terminal, and the output terminal outputs a trigger pulse to the (M+L)$^{th}$ stage of shift register circuitries to enable the (M+L)$^{th}$ stage of shift register circuitries; and wherein the (M+L)$^{th}$ stage of shift register circuitries is electrically coupled to the M$^{th}$ stage of shift register circuitries and the (N+K)$^{th}$ row of pixels, the (M+L)$^{th}$ stage of shift register circuitries has a receiving terminal for receiving the trigger pulse, the (M+L)$^{th}$ stage of shift register circuitries outputs a refreshing pulse according to the trigger pulse to refresh the (N+K)$^{th}$ row of pixels, and N, M, L, and K are positive integers; and a bending sensing unit, electrically coupled to the gate driver and disposed at the display panel, the bending sensing unit comprising at least one impedance control circuitry, wherein the impedance control circuitry exhibits different impedances according to bending of the display panel, and the at least one impedance control circuitry is electrically coupled between the output terminal and the receiving terminal.

2. The flexible display according to claim 1, wherein the at least one impedance control circuitry comprises a variable resistor, the variable resistor has different impedances according to the bending of the display panel, the variable resistor is positioned between the output terminal and the receiving terminal.

3. The flexible display according to claim 2, wherein the display panel has a non-curved portion and a curved portion, a curvature of the curved portion is greater than a curvature of the non-curved portion, the at least one impedance control circuitry comprises a first impedance control circuitry and a second impedance control circuitry, the variable resistors of the first and second impedance control circuitries are respectively disposed at the curved portion and the non-curved portion, and an impedance of the variable resistor disposed at the curved portion is greater than an impedance of variable resistor disposed at the non-curved portion.

4. The flexible display according to claim 1, wherein
the at least one impedance control circuitry has a first switch, the first switch has a first terminal, a second terminal, and a control terminal, the first terminal is electrically coupled to the output terminal, and the second terminal is electrically coupled to the receiving terminal; and
the bending sensing unit further has a plurality of impedance control circuitries, a quantity of the at least one impedance control circuitry is greater than 1, the impedance control circuitries are electrically coupled to the impedance control circuitries, and the impedance control circuitries are electrically coupled to the control terminal and have a first capacitor, and change a capacitance value of the first capacitor according to sensed pressure to control a voltage potential of the control terminal for enabling the first terminal of the first switch and the second terminal of the first switch.

5. The flexible display according to claim 4, wherein a pressure-sensitive circuit further has a second capacitor, a first terminal of the first capacitor receives a first reference voltage, a second terminal of the first capacitor is electrically coupled to a first terminal of the second capacitor and the control terminal of the first switch, and a second terminal of the second capacitor receives a second reference voltage.

6. The flexible display according to claim 4, wherein the pressure-sensitive circuit further has a second switch, a first terminal of the second switch receives a first reference voltage, a second terminal of the second switch is electrically coupled to a first terminal of the first capacitor and the control terminal of the first switch, a control terminal of the second switch receives a control signal, and a second terminal of the first capacitor receives a second reference voltage.

7. The flexible display according claim 6, wherein
the display panel has a non-curved portion and a curved portion, a curvature of the curved portion is greater than a curvature of the non-curved portion, the impedance control circuitries are respectively disposed at the curved portion and the non-curved portion, and a capacitance value of the first capacitor disposed at the curved portion is greater than a capacitance value of the first capacitor disposed at the non-curved portion.

8. The flexible display according claim 4, wherein
the display panel has a non-curved portion and a curved portion, a curvature of the curved portion is greater than a curvature of the non-curved portion, the impedance control circuitries are respectively disposed at the curved portion and the non-curved portion, and a capacitance value of the first capacitor disposed at the curved portion is greater than a capacitance value of the first capacitor disposed at the non-curved portion.

9. A flexible display, comprising:
a display panel, having a plurality of rows of pixels arranged in sequence;
a gate driver, having a plurality of stages of shift register circuitries electrically coupled to each other in sequence, wherein the shift register circuitries are electrically coupled to the plurality of rows of pixels, and provide a plurality of refreshing pulses for driving the plurality of rows of pixels to refresh, and each of the plurality of stage of the shift register circuitries further provides a trigger pulse to drive another stage of the shift register circuitries to generate one of the refreshing pulses; and
a bending sensing unit, electrically coupled to the gate driver, wherein the bending sensing unit controls, according to bending of the display panel, the impedance of a path used by at least one of the stages of the shift register circuitries to transmit the trigger pulse to the other stage of the shift register circuitries.

10. The flexible display according to claim 9, wherein
the bending sensing unit has a plurality of variable resistors, the variable resistors have different impedances according to the bending of the display panel, a terminal of each of the plurality of variable resistor is electrically coupled to an output terminal of one of the stages of the shift register circuitries, the other terminal of each variable resistor is electrically coupled to a receiving terminal of the other stage of the shift register circuitries, the output terminal provides the trigger pulse, and the receiving terminal receives the trigger pulse; and
the variable resistors are arranged in sequence on a side of the display panel, and an extending axial direction of the arrangement of the variable resistors is approximately parallel to an extending axial direction along which a non-curved portion of the display panel extends outwards from a curved portion of the display panel.

11. The flexible display according to claim 9, wherein
the bending sensing unit has a plurality of variable capacitors, wherein the variable capacitors exhibits different capacitance values according to the bending of the display panel, to further control the impedance of the path used by one of the stages of the shift register circuitries to transmit the trigger pulse to the other stage of the shift register circuitries; and the variable capacitors are arranged in sequence on a side of the display panel, and an extending axial direction of the arrangement of the variable capacitors is approximately parallel to an extending axial direction along which a non-curved portion of the display panel extends outwards from a curved portion of the display panel.

12. The flexible display according to claim 11, wherein:
the plurality of stages of shift register circuitries of the gate driver are arranged in sequence from a tail terminal of a non-curved portion of the display panel towards a tail terminal of a curved portion of the display panel; and
the flexible display further comprises a control circuit, and the control circuit is electrically coupled to the gate driver, and provides an initial pulse to the gate driver, to enable the plurality of stages of shift register circuitries wherein the plurality of stages of shift register circuitries generate the refreshing pulses in sequence starting from the shift register circuitry at the tail terminal of the non-curved portion.

13. The flexible display according to claim 9, wherein:
the plurality of stages of shift register circuitries of the gate driver are arranged in sequence from a tail terminal of a non-curved portion of the display panel towards a tail terminal of a curved portion of the display panel; and
the flexible display further comprises a control circuit, and the control circuit is electrically coupled to the gate driver, and provides an initial pulse to the gate driver, to enable the plurality of stages of shift register circuitries wherein the plurality of stages of shift register circuitries generate the refreshing pulses in sequence starting from the shift register circuitry at the tail terminal of the non-curved portion.

\* \* \* \* \*